United States Patent [19]

Cook et al.

[11] Patent Number: 5,072,567
[45] Date of Patent: Dec. 17, 1991

[54] NON-SHRINKABLE CARRIER

[75] Inventors: John E. Cook, Aslockton; James Matsumiya, Gerrards Cross, both of United Kingdom

[73] Assignee: Schlegel (UK) Holdings Limited, Seacroft, United Kingdom

[21] Appl. No.: 508,955

[22] Filed: Apr. 12, 1990

[30] Foreign Application Priority Data

Apr. 21, 1989 [GB] United Kingdom ............. 8909077
Apr. 21, 1989 [GB] United Kingdom ............. 8909078

[51] Int. Cl.⁵ ............................................. E04F 19/02
[52] U.S. Cl. .................................. 52/716; 49/490; 428/122; 428/358
[58] Field of Search ............... 52/716, 717, 718, 288; 428/122, 358; 49/490, 491

[56] References Cited

U.S. PATENT DOCUMENTS 4,413,033 11/1983 Weichman ................. 52/716 X
4,517,233 5/1985 Weichman ................. 52/716 X
4,624,093 11/1986 Gibson ......................... 52/716

Primary Examiner—Richard E. Chilcot, Jr.
Attorney, Agent, or Firm—Cumpston & Shaw

[57] ABSTRACT

A carrier for use as a stiffening member, e.g. in polymeric extrusions used in the motor and building industries, being of elongate strip form and having a plurality of longitudinally spaced, transversely extending members therein, wherein the said members are maintained in their spaced relationship by means of at least one sinuous or zig-zag securing member running longitudinally of the carrier and being welded or otherwise rigidly secured to each transversely extending member.

The or each securing member may be wire having a generally uniform zig-zag construction, wherein a substantial part of a corrugation or zig-zag thereof is located between adjacent transversely extending members, or may be wire of a more extended sinuous construction such that its transverse positioning within the carrier is varied along the length of the carrier.

10 Claims, 3 Drawing Sheets

NON-SHRINKABLE CARRIER

This invention relates to carriers which are used, inter alia, as a reinforcement in rubber and plastics extrusions used in the motor and building industries, and also as a support frame for elongate textile material edge trims in the motor industry. Typical examples of wire carriers, can be seen in patent specifications nos. U.S. Pat. No. 3,949,530, U.S. Pat. No. 3,685,231, GB-A-1545511, U.S. Pat. No. 3,239,987, U.S. Pat. No. 3,198,689, GB-A 1407412 and U.S. Pat. No. 3,430,387. This invention is, however, applicable to other types of carrier, e.g. of stamped or slotted metal or other semi-rigid resilient sheet material.

Most, if not all, known wire carriers comprise a continuous length of stiff metal wire bent to and fro into a generally zig-zag configuration, with looped wire edge regions and transverse lengths of wire in the central region of the carrier joining the looped edge regions. The transverse lengths of wire may be straight or curved and may define straight sided, banana-shaped or propeller-shaped regions therebetween or any combination thereof. The generally zig-zag wire is normally retained in its configuration by a plurality of strands of material extending longitudinally with respect to the carrier, parallel to its edges, and connected to each transverse length of wire and/or the looped edge regions by knitting thereof into the generally zig-zag wire so as to provide a stitch or knot at each crossing point. The end product is known as a knitted wire carrier and is clearly illustrated in GB-A-1407412 and U.S. Pat. No. 3,198,689. The longitudinal strands help to reduce the stretching and shrinkage of the product in which the carrier is comprised.

The aforesaid knitted wire carriers have lengthwise strands formed of textile material, such as polyester, cotton or the like, or even light wire, and have been used for many years in the manufacture of, inter alia, edge trim or combination edge trim/door, or boot, seals for motor vehicles. More recently, carriers of the slotted or stamped metal type have also been used in the manufacture of such edge trim/seals. The edge trims are normally formed by extruding a polymeric material onto the carrier, by passing it through an extruder, then conforming the resultant product to a generally U-shaped cross-section, by passing it through a forming die. Alternatively, in some instances, the carrier may be pre-formed into a U-shape, then passed through an extruder with a U-shaped die.

Passing the carrier through the extrusion and/or forming dies normally involves its being dragged or pulled through the dies from its forward end, and this results in the carrier being stretched as it is passed through the dies. This presents a problem in that the resulting product has a tendency to shrink, which, particularly if it occurs after installation on, for example, a motor vehicle door flange, causes great inconvenience and may necessitate replacement and in any case involves the trim being cut oversized to account for shrinkage between cutting and installation. The problems of stretching and shrinkage are particularly acute with carriers of the knitted wire type, or the slotted metal type wherein adjacent slots overlap to some extent, but exist nevertheless in all types.

It has been proposed to alleviate the problems associated with stretching and shrinkage of the carrier by providing a continuous straight length of stiff metal wire running parallel to the edges of the carrier and welded to each of the transverse lengths of wire and/or metal slats in the central region of the carrier. Whilst reducing the problems associated with shrinkage of the end product, the wire substantially reduces the flexibility thereof. If more than one wire is provided along the length of the carrier, the possibility of any lateral flexing of the carrier is completely eliminated.

Although the whole purpose of knitted wire or other carriers in extruded edge trims is to stiffen the polymeric material of the extrusion, in order for it better to grip, for example, a motor vehicle door flange, there is nevertheless a requirement for local flexibility so that the trim can negotiate various bends in the flange satisfactorily.

It is an object of the present invention to provide a carrier for incorporation into an edge trim which substantially overcomes the problems of stretching and shrinkage, yet still provides for flexibility of the resulting product.

With the ever increasing complexity in motor vehicle manufacture, and in particular, the ever increasing customer requirement for efficient, goo looking door seals in motor vehicles, it is important the door seals fit correctly and do not fall off or become displaced. If they do become displaced even by a small amount, they will look unsightly, will affect door shut pressures, and will also not form a satisfactory air/water seal between the door and door opening.

Modern motor vehicles tend to be manufactured with a distinct waistline half way up the body, at approximately door lock height, and this results in two changes of direction in the flange to which the edge trim/door seal is to be fitted. Furthermore, with the advent of small motor vehicles, the sealing strip is required to negotiate sharp inside and outside bends, as well as lateral bends at the waistline, and yet still maintain its correct location on the flange, in spite of regular opening and shutting of the door. It must also be borne in mind that when the edge trim is bent, especially if it has a door seal attached or integral therewith, then the polymeric material may deform, or wrinkle or buckle, as a result of stretching, twisting or compression, thus resulting in an ugly appearance. To a large extent, these deficiencies can be minimised or avoided by designing the stiffness of the knitted wire carrier accordingly, e.g. by making selected regions of the carrier stiffer than others, either along the length of the carrier, or across its width.

Various attempts to vary the stiffness of wire carriers have been proposed, and these proposals have met with different levels of success. For example, in EP-B-0155811, a knitted wire carrier is disclosed wherein at least two different zig-zag wires are incorporated in the carrier. In another construction disclosed in EP-B-0045176, two different types of textile material are used for the knitted longitudinal strands, one of the materials being degradable so that when a controlled amount of heat, or radiation, or other means is applied to the edge trim or the like in which the knitted carrier is located, the one material can be degraded so that it will no longer inhibit relative movement of the transverse lengths of wire in the carrier, and will thus cause a change in the stiffness of that region of the carrier.

These attempts to vary the stiffness of the carrier suffer from two disadvantages, namely the difficulty of varying the stiffness or flexibility across the width of the carrier, because, throughout its length, the carrier is formed of uniform construction and the problems associated with stretching and shrinkage as previously discussed.

It is another object of the present invention to provide a carrier for incorporation into an edge trim which substantially overcomes the problems of stretching and shrinkage, yet provides for varying stiffness and flexibility along the length of the carrier.

According to the present invention there is provided a carrier for use as a stiffening member, e.g. in polymeric extrusions used in the motor and building industries, said carrier being of elongate strip form and having a plurality of longitudinally spaced, transversely extending members therein, characterised in that the said members are maintained in their spaced relationship by means of at least one sinuous or zig-zag securing member running longitudinally of the carrier and being welded or otherwise rigidly secured to each transversely extending member.

Preferably there are included a plurality of such securing members.

According to a first aspect of the present invention, the or each securing member is preferably wire having a generally uniform zig-zag construction, and at least a substantial part of a corrugation or zig-zag thereof is located between adjacent transversely extending members. It will, of course, be understood that the term "wire" embraces metal wire, polymeric wire or other semi-rigid resilient wire, and that the term "weld" includes within its scope arc-welding or heat welding or other means of fusion, e.g. adhesives.

The or each securing member may run parallel to the edge of the carrier, or its transverse location within the carrier may vary along the length thereof. Use of a zig-zag rather than a straight securing member ensures that flexibility of the carrier is maintained, whilst its ability to stretch is reduced. This is particularly advantageous if a plurality of such securing members is provided, since lateral flexing of the carrier still remains possible. Variation of the transverse location of the securing member provides for variations in the character of the local flexibility of the carrier.

A preferred development of this aspect of the invention lies in forming the transversely extending members from a length of wire bent to and fro to form a zig-zag construction, the alternate ends of adjacent transversely extending members being connected by U-shaped loop portions defining the opposite edges of the carrier, and into which is knitted at least one warp strand.

The said at least one warp strand may be degradable by heat or chemical, mechanical or other means and may be so degraded after the edge trim is formed.

According to a second aspect of the present invention, the or each securing member is of a more extended zig-zag or sinuous construction and this results in its transverse position within the carrier being varied along the length of the carrier. Once again, this transverse variation of the positioning of the securing member influences the character of the local flexibility of the end product.

Again, the transversely extending members may be formed from at least one length of stiff wire bent to and fro to form a zig-zag construction, the alternate ends of adjacent transversely extending members being connected by U-shaped loop portions defining the opposite edges of the carrier, and into which is knitted at least one warp strand.

Alternatively, the transversely extending members may consist of sheet metal, or other semi-rigid resilient sheet material, as, for example, in a slotted or stamped metal carrier.

The present invention is now described by way of example with reference to the accompanying schematic drawings, in which.

Figure 9A:
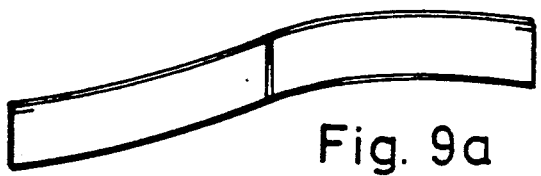
Figure 9B:
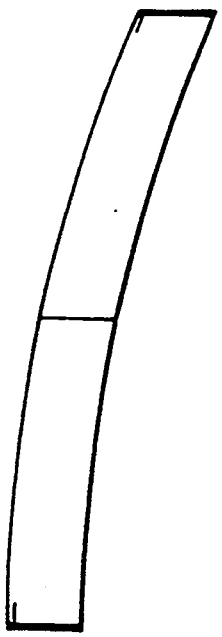
Figure 9C:
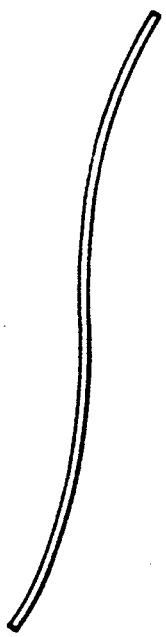
Figure 10A:
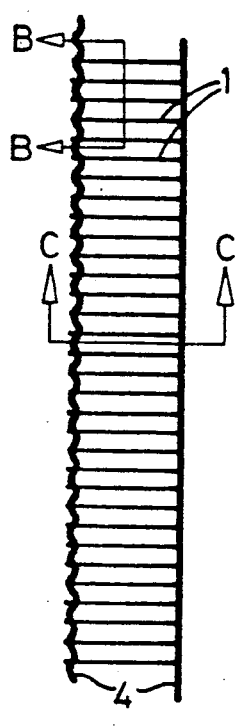
Figure 10B:
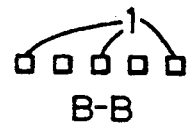
Figure 11:
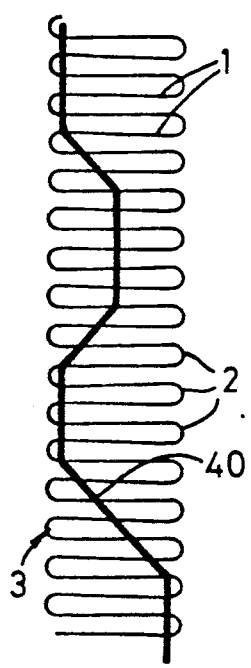
Figure 12:
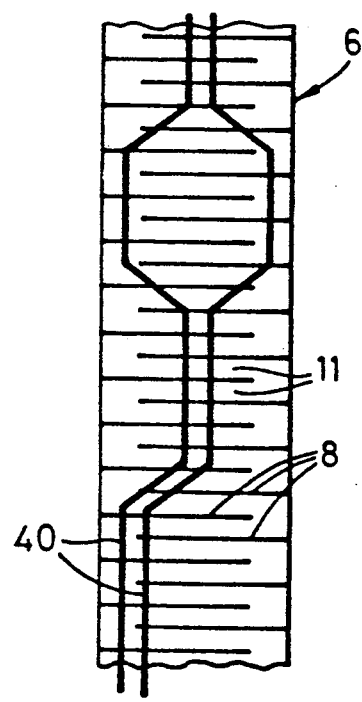

FIGS. 9a–c are schematic representations of a carrier according to the present invention, when flexed;

FIGS. 10a shows another embodiment of a carrier according to the first aspect of the present invention; with FIGS. 10b and c being sections along the lines BB and CC respectively of FIG. 10a, and illustrating by way of example a variety of wire cross-sections which may be used in a carrier according to the present invention;

FIG. 11 shows a wire carrier according to the second aspect of the present invention; and FIG. 12 shows a slotted or stamped metal carrier according to the second aspect of the present invention.

Briefly, FIGS. 1 and 3–6 all show carriers comprising a length of stiff wire (3) bent to and fro to form a zig-zag construction, thereby forming a plurality of transversely extending members (1), alternate ends of adjacent of which being connected by U-shaped loop portions (2) defining the opposite edges of the carrier. The transverse members (1) are maintained in their spaced relationship by a plurality of warp strands of textile or other material running longitudinally of the carrier and connected by knitting or stitching to each member (1) in known manner and by means of at least one sinuous or zig-zag securing member (4) which or each of which is rigidly secured to each transversely extending member (1) e.g. by welding.

Figure 1:
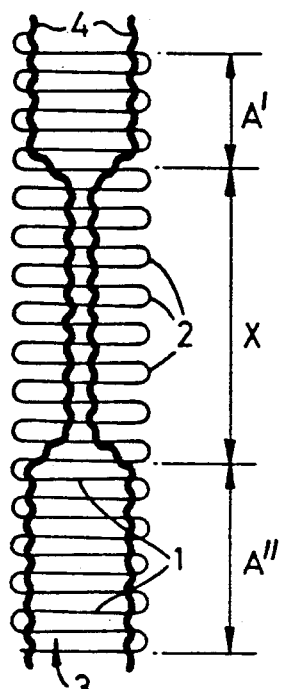
FIG. 1 shows a carrier according to the first aspect of the present invention.
Figure 2:
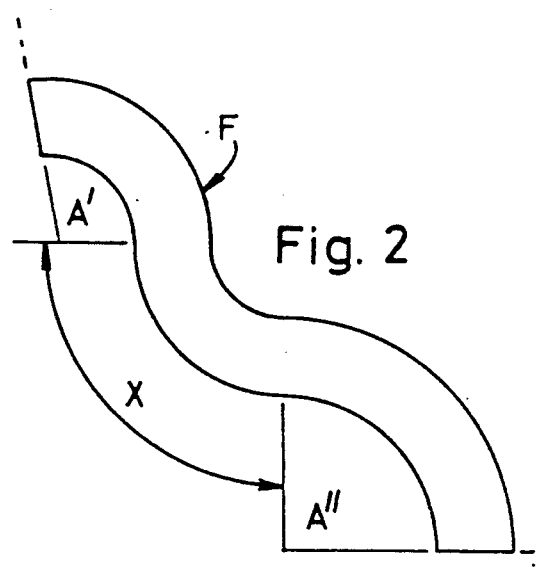
FIG. 2 shows to an enlarged scale part of a flange having a free edge (F) with which the carrier of FIG. 1 is intended to co-operate.

The carrier of FIG. 1 includes two securing members (4), and comprises three distinct longitudinal zones (A', X, A''). In zones A' and A'', the securing members are disposed towards opposite edge regions of the carrier. When the carrier is deformed into its final U-shape and incorporated in an edge trim, the spine region of the resulting edge trim is longitudinally extendable which makes it suitable for installation on an outer circumference of a flange, as illustrated in regions A' and A'' in FIG. 2. In zone X of the carrier of FIG. 1, the securing members (4) are disposed in the central region of the carrier, which results in the edge regions of the final edge trim being extendable, and in this zone being particularly suited for installation on an inner circumference of a flange, as illustrated in region X of FIG. 2.

Figure 3:
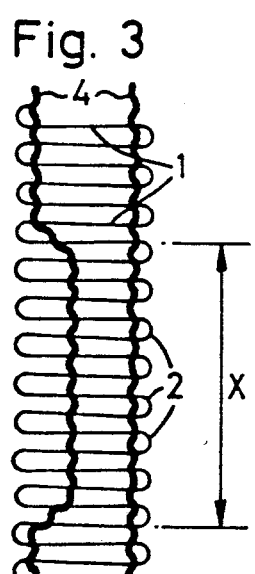
FIGS. 3–6 show other embodiments of carriers according to the first aspect of the present invention.

The carrier of FIG. 3 is similar to that of FIG. 1 except that in zone X, only one of the securing members (4) is disposed in the central region of the carrier. This zone of the carrier is particularly suited to traversing a lateral bend in a flange, since only one edge of the resulting edge trim will be extendable.

Figure 4:
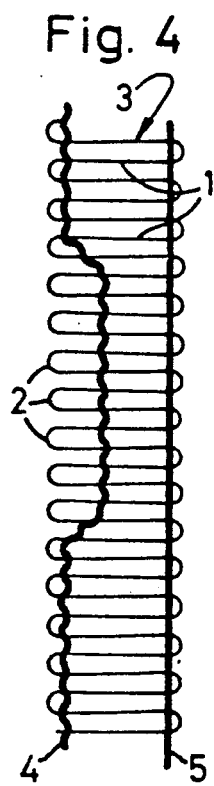
Figure 5:
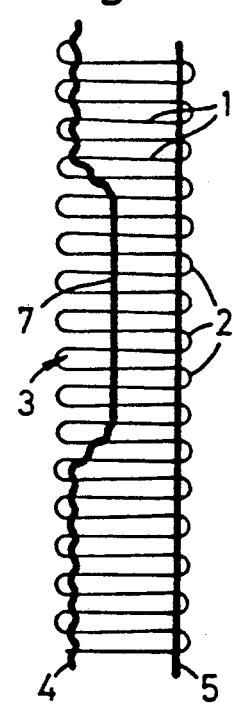

The carriers of FIGS. 4 and 5 are similar in function to that of FIG. 3 except that they include one sinuous securing member (4) and one straight welded wire (5). In FIG. 5, the sinuous securing member (4) includes a straight middle zone (7).

Figure 6:
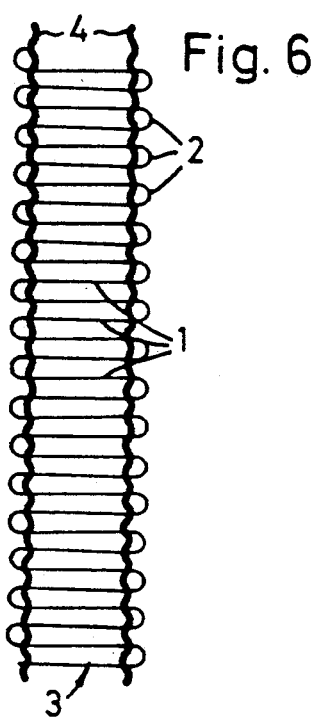
Figure 7:
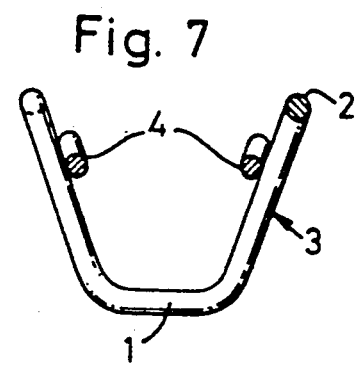
FIG. 7 shows to an enlarged scale a cross-sectional view of the carrier of FIG. 6, when formed into a U-shape.

The carrier of FIGS. 6 and 7 is similar to zones A' and A" of that of FIG. 1.

Figure 8:
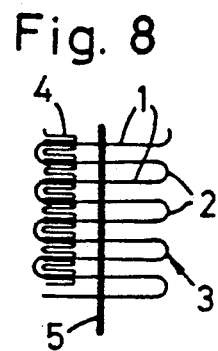
FIG. 8 shows a carrier according to the first aspect of the present invention, but having greater lateral flexibility than those of FIGS. 1 and 3–7.

The carrier of FIG. 8 comprises a length of stiff wire (3) bent to and fro to form a zig-zag construction thereby forming a plurality of transversely extending members (1), alternate ends of adjacent of which being connected by U-shaped loop portions (2) defining the opposite edges of the carrier. This carrier is provided with the normal warp strands and with a central straight wire (5), and a tightly formed zig-zag securing member (4) which is secured to each transversely extending member (1).

The securing member (4) of the embodiment of FIG. 8 is formed of wire of substantially smaller cross-section than that of the transversely extending members (1), and ensures greater flexibility on the resulting edge trim.

FIGS. 9a-c simply serve to illustrate the flexibility of the carriers according to the present invention, with FIG. 9b showing lateral flexing and FIG. 9c showing dorsal/ventral flexing.

The carrier of FIG. 10a comprises a plurality of spaced transversely extending members (1) formed of stiff wire. These transverse members are maintained in their spaced relationship by means of the normal knitted warp strands and by means of a sinuous or zig-zag member (4) running adjacent one edge of the carrier, and by means of a straight wire (5) running adjacent the other edge. The two longitudinal members (4; 5) are welded to each transversely extending member (1), thereby forming a welded ladder construction.

Figure 10C:
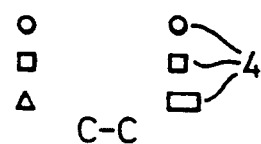

As can be seen from FIG. 10b, the transversely extending members (1) may be of square cross-section, but they may also be of circular, rectangular or triangular or other cross-section. As can be seen from FIG. 10c, the longitudinal members (4; 5) may be of circular, square, rectangular or triangular cross-section and may also be of any other cross-section.

The carrier of FIG. 11 is constructed from a length of stiff wire (3) bent to and fro to form a zig-zag configuration, thereby forming a plurality of transversely extending members (1), alternate ends of adjacent of which are connected by U-shaped loop portions (2) defining the opposite edges of the carrier. The transverse members (1) are maintained in their spaced relationship by the traditional longitudinally extending warps connected by knitting or stitching to the members (1) and by a sinuous securing member (40), which in this embodiment is of a more extended zig-zag or sinuous form than the members (4) in the previous embodiment, and whose transverse location within the carrier varies along its length.

The carrier of FIG. 12 is constructed of stamped or slotted metal or other sheet material (6) with overlapping slits or slots (8) defining transverse members (11). In a similar manner to the embodiment of FIG. 11, two sinuous securing members (40), e.g. of wire, are welded to the slotted metal's transverse members (11) to vary the stiffness of the carrier along its length.

It will, of course, be understood that the present invention has been described above purely by way of example, and that modifications of detail may be made within the scope of the invention as defined by the accompanying claims.

What is claimed is:

1. An elongate strip carrier for use as a stiffening member, comprising a plurality of longitudinally spaced, transversely extending members and at least one zig-zag member running longitudinally of the carrier and intersecting the transversely extending members at a plurality of crossing points, said zig-zag member being welded or otherwise rigidly secured to the transversely extending members at the crossing points by connecting means that do not otherwise limit extension of the carrier, for maintaining said transversely extending members in their spaced relationship while allowing a limited controlled amount of extension.

2. A carrier according to claim 1 and comprising a plurality of zig-zag members.

3. A carrier according to claim 1 wherein the at least one zig-zag member comprises a wire having a generally uniform zig-zag construction, and wherein at least part of a zig-zag of the at least one zig-zag member is located between each of said transversely extending members.

4. A carrier according to claim 1 wherein said at least one zig-zag member comprises a wire having a generally uniform zig-zag construction and wherein at least part of a zig-zag of the at least one zig-zag member is located between at least two of the transversely extending members.

5. A carrier according to claim 1 wherein the transverse location of the said at least one zig-zag member is varied along the length of the carrier.

6. A carrier according to claim 1 wherein the at least one zig-zag member extends generally parallel to an edge of the carrier.

7. A carrier according to claim 1 comprising a length of wire bent to and fro into a sinuous construction to provide said transverse members, alternate ends of which are connected to their adjacent transverse members by U-shaped loop portions defining the opposite edges of the carrier, and one or more warp strands knitted into said carrier.

8. An elongated strip carrier for use as a stiffening member, comprising:
a plurality of longitudinally spaced, transversely extending members; and
at least one longitudinally extending member intersecting the transversely extending members at a plurality of crossing points, the longitudinally extending member varying in its transverse position along the length of the carrier;
each longitudinally extending member intersecting, and being securely attached to, said transversely extending members at the crossing points by means that do not otherwise limit extension of the carrier, for maintaining said transversely extending members in their spaced relationship while allowing a limited, controlled amount of extension.

9. A knitted wire carrier comprising at least one zig-zag wire forming a plurality of longitudinally spaced transversely extending lengths of wire joined by U-shaped loops of wire along each edge of the carrier, at least one strand of material extending lengthwise of the carrier, which strand is joined to the wire by knitted or stitched connections and maintaining said transversely extending members in their spaced relationship, and at least one longitudinally extending length of metal intersecting the transversely extending members at a plurality of crossing points and welded or otherwise firmly attached to each transversely extending length of wire at the crossing points by means that do not otherwise limit extension of the carrier, for maintaining said transversely extending members in their spaced relationship while allowing a limited controlled amount of extension, wherein the at least one longitudinally extending length of wire or strip of metal varies in its transverse location along the length of the carrier.

10. A stamped or slotted carrier of semi-rigid sheet material comprising a plurality of transversely extended members and at least one longitudinally extending member intersecting the transversely extending members at a plurality of crossing points, and welded or otherwise securely attached to transversely extending members of the carrier at the crossing points by means that do not otherwise limit extension of the carrier for maintaining said transversely extending members in their spaced relationship while allowing a limited controlled amount of extension, wherein the at least one longitudinally extending member varies in its transverse location along the length of the carrier.

* * * * *